United States Patent Office 3,163,598
Patented Dec. 29, 1964

3,163,598
METHOD FOR DISPOSAL OF INDUSTRIAL WASTE WATER
Akira Yoshihara, Tsutomu Yoshihara, Kenji Okada, and Shigeharu Sakaguchi, Tokyo, Japan (all % Glascock, Downing and Seebold, National Press Bldg., Washington, D.C.)
No Drawing. Filed Dec. 3, 1962, Ser. No. 241,515
Claims priority, application Japan, Dec. 5, 1961, 36/43,476
3 Claims. (Cl. 210—47)

The disposal of industrial waste waters is becoming a very necessary factor in modern industry. From the viewpoint of expense, however, the direct influence of the cost of such disposition upon the price of the product necessarily demands a positive reduction in the working cost for the disposition, especially in the expenditure for consumables employed in the disposition.

Generally speaking, industry is seeking a method which enables 1 m.$^3$ of waste water to be disposed at an ordinary expenditure below 1¼ cents for the chemicals used as the disposing agent. In practice, however, all efforts which make use of cheap by-products or wastes produced in factories as disposing chemicals fail due to the expenses incurred in collecting the cheap materials, unless measures are taken for repeated use of the collected materials.

According to the present invention, an industrial waste water is treated in the course of its clarification first with active charcoal, charcoal powder, powdered carbide, wood chips, wood dust or the like, then with a zinc compound such as zinc chloride or zinc sulfate, either separately or in combination, and further, if necessary, with zinc oxide. The zinc compound thus added reacts, in the case of an alkaline waste liquor, on the alkali contained in the liquor. In the case of a neutral or acidic waste liquor, the zinc compound is made to react on an alkaline substance further added such as slaked lime. Thus, when zinc chloride is employed, there takes place either of the following reactions:

$$ZnCl_2 + 2NaOH = Zn(OH)_2 + 2NaCl$$
$$ZnCl_2 + Ca(OH)_2 = Zn(OH)_2 + CaCl_2$$

As a result of either of the above reactions, there are produced flocks of zinc hydroxide which cause coloring matters and colloidal substances to be coagulated out of the waste liquor so that the liquor undergoes decolorization as well as clarification.

When the flocks are separated by sedimentation, concentrated into a solid state, dried and incinerated, organic matter from the slime is burnt away and there is left as residue an ash containing zinc oxide.

$$Zn(OH)_2 \rightarrow ZnO + H_2O$$

From this ash, zinc can be recovered by treating the ash with an acidic waste liquor or an aqueous mineral acid such as hydrochloric acid or sulfuric acid whereby the zinc oxide in the ash is dissolved to produce a zinc salt such as zinc chloride and zinc sulphate.

It should be noted that since, in every run of repeated charge and recovery of zinc, an amount of 5% or so inevitably escapes recovery due to washing and other factors, the loss must be compensated by steadily supplying definite quantities of zinc compound. As the zinc compound thus to be supplied, zinc chloride preparations on the market (either liquid or solid) may be used. However, zinc chloride is relatively expensive and therefore the present inventors turned for the source of zinc chloride to such inexpensive zinc-containing materials as the so-called "Salmiac" obtainable as a by-product in manufacturing plants for galvanized ion sheets. ("Salmiac" comprises, besides small amounts of iron salts and fine particles of carbon as impurities, Zn, ZnO, $ZnCl_2$ and $NH_4Cl$, its zinc content being 40–50%) and also to the so-called dyestuff zinc sediment which corresponds to a by-product ($Zn(OH)_2$) produced in some chemical plants and dyestuff plants where powder of metallic zinc is employed as a reducing agent. The zinc sources above mentioned could supply inexpensive processing agents for making zinc chloride in the course of processing.

Due to the well known fact that zinc oxide dissolves readily in acids, the processing operation and apparatus are both very simple. According to the present invention, zinc can be recovered with ease, the rate of recovery amounting to about 95%. The ordinary expenditure for chemicals is illustrated by the following data:

For a waste water having a pH of
  10.5 and above _____ 0.15 cent per 1 m.$^3$.
For a waste water of pH 6–7 (in
  the case of using calcium carbide) _____ 0.75 cent per 1 m.$^3$.
For a waste water of pH 6–7 (in
  the case of using a slaked lime
  on the market) _____ 1 cent per 1 m.$^3$.

In addition to reducing the ordinary expenditure to a level lower than 1.25 cents per 1 m.$^3$ waste water, further advantages result from the method of the present invention, as follows:

(1) The processing condition of about pH 7.5 enables the processed water to be almost at the neutrality.

(2) Coagulation tendency of flocks is good enough for the filter membrane to be substantially protected from injury and also for the filtration velocity to be improved to a marked extent.

(3) Organic matters in the disposition product can be smoothly burnt on subjecting the product to incineration. (Iron salts exhibit a tendency to retard the incineration.)

(4) The processed water is obtained with a high degree of clearness.

(5) Since the ash dissolves immediately in acids without any further processing such as reduction, zinc can be recovered quite easily.

(6) The flocks exert a great coagulating effect upon coloring matters and colloidal substances in the waste water.

The method of the present invention will now be explained by way of a practical example in which a batch of waste washings from SCP pulp manufacturing process was submitted to such method.

Zinc chloride as processing agent:

(a)

| | Kg. |
|---|---|
| "Salmiac" (in coarse fragments) | 1,000 |
| 20% hydrochloric acid as a waste material | 400 |
| Water | 200 |

After subjecting the mixture comprising the foregoing ingredients to homogenization for about 3 hours, there was obtained 1,600 kg. of an aqueous solution containing zinc chloride at a concentration of 50%.

(b)

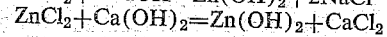

| | Kg. |
|---|---|
| "Salmiac" | 1,000 |
| Waste liquor from chlorine-bleaching having a pH of 1–2 | 5,200 |

After subjecting the above mixture to homogenization for 30 minutes, there was obtained 6,200 kg. of a zinc chloride solution at a concentration of about 10–13%.

(c)

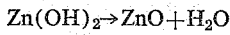

| | Kg. |
|---|---|
| Ash from incineration (90% ZnO) | 1,000 |
| Waste liquor from chlorine-bleaching having a pH of 1–2 | 80,000 |

There was obtained 81,000 kg. of a zinc chloride solution of about 1.5% in concentration.

A batch of waste washings from SCP pulp processing (the batch showed a coloration degree of 1,000–1,600 and a pH of 6.3–6.6) was submitted to decolorization according to the following procedure:

A preparation of slaked lime in the form of 10% milk of lime is added to establish a $Ca(OH)_2$ content of 1,000 p.p.m. and a pH of 10.5. The $NH_3$ in the waste liquor is eliminated by introducing an air current, resulting in partial coagulation of $CaCO_3$, $CaSO_4$ and other substances, a part of which has already been converted into a colloidal state. When $ZnCl_2$ in the form of any one of the above listed liquid preparations (a), (b) and (c) is added in an amount which allows a zinc content of 1,900–2,600 p.p.m. to be established, there is attained a pH of about 7.5. On arrival at the above condition, the liquor experiences clarification and decolorization with simultaneous formation of flocks which settle down after stirring for about 5 minutes. The precipitate thus formed is then led into a tank and held therein until a slimy fraction is completely separated from a clear layer of supernatant liquor which is thereafter removed by way of an overflow means. The slime layer thus separated is then converted into a solid mass by concentration and filtration. After the solid mass of slimy waste is incinerated and the ash thus produced is brought into a portion of acidic waste liquor from bleaching process, zinc chloride is recovered in the form of a solution.

The solidified waste slime to be incinerated has a moisture content of about 75% and can be reduced to ashes by the help of a combustion promoting agent employed in an amount of about 240 kcal. per ton of waste slime. The cost of fuel required is thus quite small. The process of incinerating waste slime being capable of being carried out at an expense as small as ¼ of the carriage for disposition, the process of the present invention may be looked upon as an economical one.

While the foregoing description deals with the use of zinc chloride, the process can be improved in its effectiveness when zinc sulfate is employed, either singly in place of zinc chloride, or in combination with the latter.

Having thus described the invention, what is claimed as new and desired to be secured by Letters Patent is:

1. In a process for the disposal of industrial waste waters in which a waste water containing organic substances as main contaminants, such as waste water from pulping, raw wool washing, textile washing, hide tanning, slaughtering or the like, is clarified, the improvements which comprise: mixing the waste waters with zinc chloride and zinc sulfate to produce flocks of slime, separating the flocks thus formed from the remaining liquid; then drying, and then incinerating the separated flocks to produce an ash containing zinc oxide; dissolving the ash containing zinc oxide in an acid solution and using the resulting solution to provide the zinc salts used as the initial processing agent mixed with the waste waters.

2. In a process for the disposal of industrial waste waters in which a waste water containing organic substances as main contaminants, such as waste water from pulping, raw wool washing, textile washing, hide tanning, slaughtering or the like is clarified, the improvements which comprise: adding carbonaceous powder and woody matters to the waste waters being clarified; then mixing the same with zinc chloride and zinc sulfate; adding slaked lime to the resulting solution to produce an alkalinity at which flocks of slime are precipitated; and then drying, and incinerating the precipitate of slime flocks thus formed to produce an ash containing zinc oxide; dissolving the ash containing zinc oxide in an acid solution and using the resulting solution to provide the zinc salts used as the initial processing agent mixed with the waste waters.

3. In a process for the disposal of industrial waste waters in which a waste water containing organic substances as main contaminants, such as waste water from pulping, raw wool washing, textile washing, hide tanning, slaughtering or the like is clarified, the improvements which comprise: adding carbonaceous powder and woody matters to the waste waters being clarified; then mixing the same with zinc chloride and zinc sulfate; adding slaked lime to the resulting solution to produce an alkalinity at which flocks of slime are precipitated; then drying and incinerating the precipitate of slime flocks thus formed to produce an ash containing zinc oxide; dissolving the ash containing zinc oxide in an inorganic acid solution with a pH below 3.0; recovering the resulting solution and reusing the recovered solution to provide the zinc salts used as the initial processing agent mixed with the waste waters.

References Cited in the file of this patent

UNITED STATES PATENTS

| | | |
|---|---|---|
| 1,928,398 | Urbain | Sept. 26, 1933 |
| 2,074,082 | Domogalla | Mar. 16, 1937 |
| 2,243,826 | Nielsen et al. | May 27, 1941 |
| 2,511,299 | Seifriz et al. | June 13, 1950 |
| 2,653,900 | Holland | Sept. 29, 1953 |

FOREIGN PATENTS

| | | |
|---|---|---|
| 3,252 | Great Britain | June 30, 1883 |
| 22,827 | Great Britain | of 1894 |